US012769657B2

(12) United States Patent
Kalyanasundharam et al.

(10) Patent No.: US 12,769,657 B2
(45) Date of Patent: Oct. 20, 2026

(54) UNIFIED FLEXIBLE CACHE

(71) Applicant: Advanced Micro Devices, Inc., Santa Clara, CA (US)

(72) Inventors: Vydhyanathan Kalyanasundharam, Santa Clara, CA (US); Alan D. Smith, Austin, TX (US); Chintan S. Patel, Austin, TX (US); William L Walker, Ft. Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 29 days.

(21) Appl. No.: 18/090,249

(22) Filed: Dec. 28, 2022

(65) Prior Publication Data

US 2024/0220409 A1 Jul. 4, 2024

(51) Int. Cl.
*G06F 12/0802* (2016.01)

(52) U.S. Cl.
CPC .. *G06F 12/0802* (2013.01); *G06F 2212/1024* (2013.01)

(58) Field of Classification Search
CPC ..................... G06F 12/0802; G06F 2212/1024
See application file for complete search history.

(56) References Cited

U.S. PATENT DOCUMENTS 6,230,260 B1 * 5/2001 Luick .................... G06F 9/3804 712/E9.071
6,718,454 B1 * 4/2004 Ebner ................. G06F 12/0215 711/204
2003/0093621 A1 * 5/2003 DeSota ............... G06F 12/0848 711/E12.021
2003/0158999 A1 * 8/2003 Hauck ................. G06F 12/0866 711/120
2009/0327616 A1 * 12/2009 Conway ................ G06F 12/082 711/146
2012/0005432 A1 * 1/2012 Joshi ................... G06F 12/0831 711/E12.04
2014/0173211 A1 * 6/2014 Loh ..................... G06F 12/0888 711/129
2016/0179382 A1 * 6/2016 Blagodurov ............ G06F 3/061 711/154
2018/0373635 A1 12/2018 Mukherjee et al.
2019/0294546 A1 * 9/2019 Agarwal ............... G06F 3/0611
2021/0160337 A1 5/2021 Chandrasekaran et al.
2022/0058132 A1 2/2022 Roberts et al.
2022/0239755 A1 7/2022 Vijayashekar et al.

FOREIGN PATENT DOCUMENTS

KR 10-2020-0131857 A 11/2020

OTHER PUBLICATIONS

International Search Report and Written Opinion from corresponding PCT Application No. PCT/US2023/085935, dated Apr. 24, 2024 (10 pages).

* cited by examiner

*Primary Examiner* — Larry T Mackall
(74) *Attorney, Agent, or Firm* — Greenberg Traurig, LLP

(57) ABSTRACT

The disclosed computer-implemented method includes partitioning a cache structure into a plurality of cache partitions designated by a plurality of cache types, forwarding a memory request to a cache partition corresponding to a target cache type of the memory request, and performing, using the cache partition, the memory request. Various other methods, systems, and computer-readable media are also disclosed.

20 Claims, 6 Drawing Sheets

UNIFIED FLEXIBLE CACHE

BACKGROUND

Current processor architectures often include various processing cores and/or chiplets with various cache structures on a die. The cache structures can be client-side caches (e.g., caches used by processors) or memory-side caches (e.g., caches representing memory devices that can be off die). The cache structures are designed with specific purposes with no ability to repurpose them.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
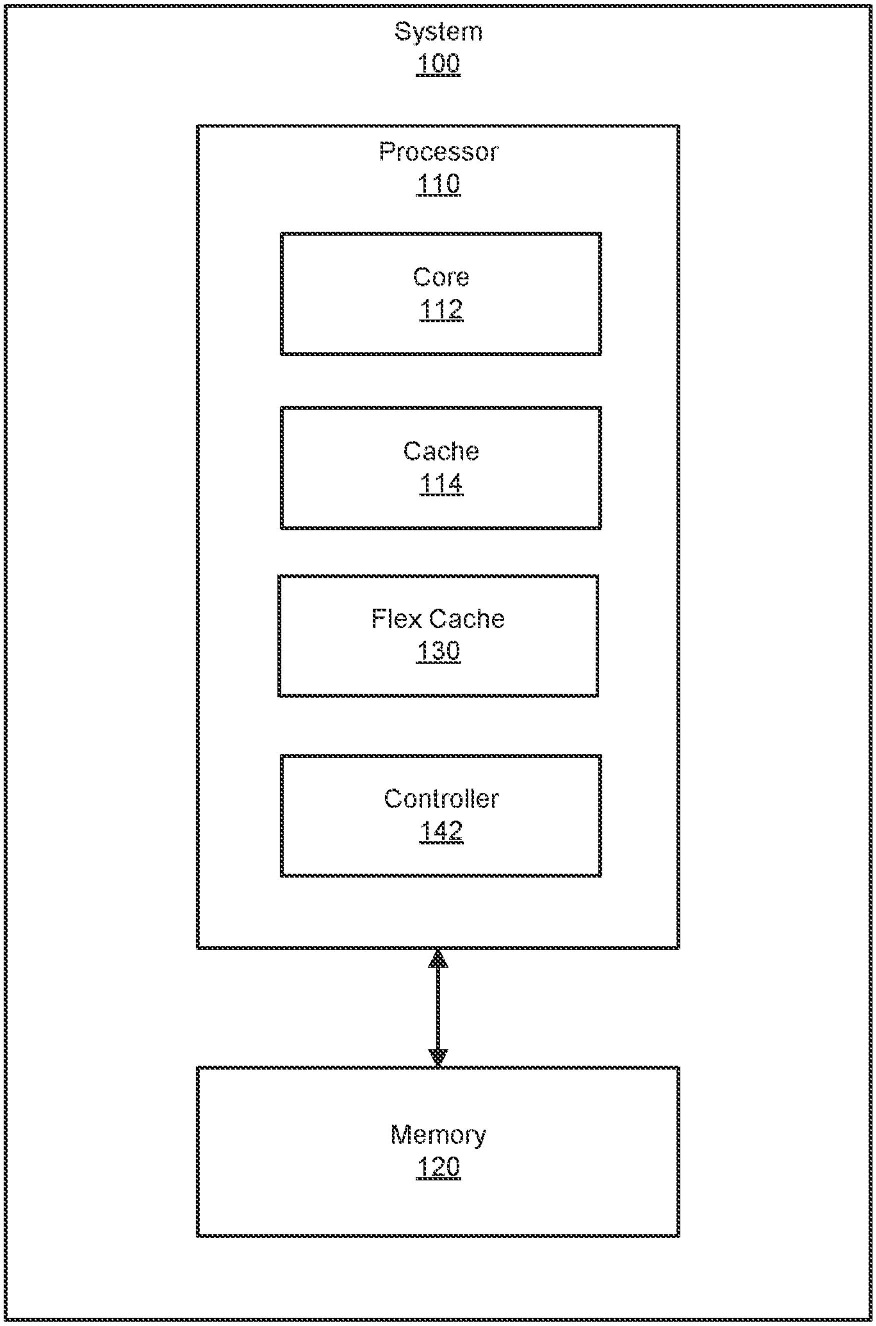
FIG. 1 is a block diagram of an exemplary system for a unified flexible cache.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a unified flexible or flex cache. As will be explained in greater detail below, implementations of the present disclosure can configure a cache structure into multiple purposes or cache types, and forward memory requests to the cache structure accordingly. Implementing a flex cache as described herein can improve the functioning of a computer itself by more efficiently utilizing cache structures, reducing latency of signals, and improving cache performance.

As will be described in greater detail below, the instant disclosure describes various systems and methods for configuring and using a unified flex cache. A cache structure can be partitioned into cache partitions of various cache types and memory requests can be forwarded to a target cache partition based on a target cache type of the memory request, such that the target cache partition can perform the memory request.

In one example, a device for a flex cache includes a cache structure and a cache controller. The cache controller is configured to partition the cache structure into a plurality of cache partitions designated by a plurality of cache types, forward a memory request to a target cache partition corresponding to a target cache type of the memory request, and perform, using the target cache partition, the memory request.

In some examples, forwarding the memory request is based on an addressing scheme incorporating cache types. In some examples, the addressing scheme includes one or more bits for identifying a target cache partition. In some examples, the one or more bits correspond to a port coupled to the target cache partition.

In some examples, partitioning the cache structure includes partitioning the cache structure based on physical delineations of the cache structure. In some examples, the physical delineations correspond to at least one of a bank, a way, an index, or a macro.

In some examples, the plurality of cache types includes at least one of a processor cache, an accelerator cache, a memory cache, or a probe filter. In some examples, partitioning the cache structure further comprises partitioning the cache structure at a boot time. In some examples, partitioning the cache structure further comprises dynamically partitioning the cache structure based on a workload.

In one implementation, a system for a flex cache includes at least one physical processor, a physical memory, a cache structure including a plurality of ports, and a cache controller. The cache controller is configured to partition the cache structure into a plurality of cache partitions designated by a plurality of cache types, each cache partition coupled to at least one of the plurality of ports, forward a memory request along one of the plurality of ports to a target cache partition of the memory request, and perform, using the target cache partition, the memory request.

In some examples, forwarding the memory request is based on an addressing scheme including one or more bits for identifying a port coupled to the target cache partition. In some examples, partitioning the cache structure includes partitioning the cache structure based on at least one of a bank, a way, an index, or a macro.

In some examples, the plurality of cache types includes at least one of a processor cache, an accelerator cache, a memory cache, or a probe filter. In some examples, partitioning the cache structure further comprises partitioning the cache structure at a boot time of the device. In some examples, partitioning the cache structure further comprises dynamically partitioning the cache structure based on a workload of the device.

In one implementation, a method for a flex cache includes partitioning a cache structure into a plurality of cache partitions designated by a plurality of cache types during a boot time of a system, forwarding a memory request to a cache partition corresponding to a target cache partition of the memory request, and performing, using the cache partition, the memory request.

In some examples, forwarding the memory request is based on an addressing scheme that includes one or more bits for identifying a target cache type. In some examples, partitioning the cache structure includes partitioning the cache structure based on at least one of a bank, a way, an index, or a macro. In some examples, the plurality of cache types includes at least one of a processor cache, an accelerator cache, a memory cache, or a probe filter. In some examples, partitioning the cache structure further comprises dynamically partitioning the cache structure based on a workload of the system.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of a unified flexible cache and related systems and methods. Detailed descriptions of an example system are provided in connection with FIG. 1. Detailed descriptions of example cache architectures are provided in connection with FIGS. 2-4. Detailed descriptions of an example memory request routing are provided in connection with FIG. 5. Detailed descriptions of corresponding computer-implemented methods will also be provided in connection with FIG. 6.

FIG. 1 is a block diagram of an example system 100 for a flex cache. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non—volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a core 112, a cache 114, a flex cache 130, and a controller 142. Core 112 corresponds to a processor core, although in other examples corresponds to a chiplet such as a chiplet of an accelerator. Cache 114 corresponds to a cache used by processor 110 (e.g., a client-side cache such as a low-level cache or L1 cache). In some examples, cache 114 corresponds to and/or includes other caches, such as a memory-side cache. Flex cache 130 corresponds to a cache structure that can be flexibly used for various purposes as will be discussed further herein. Controller 142 corresponds to a control circuit that can configure and control flex cache 130, such as by coordinating memory requests to flex cache 130. In some examples, controller 142 also controls aspects of cache 114.

Processor 110 reads and operates on instructions and/or data stored in memory 120. Because memory 120 is often slower than processor 110, memory access times create bottlenecks for processor 110. To alleviate this problem, processor 110 includes cache 114, which is typically a fast memory with access times less than that of memory 120, in part due to being physically located in processor 110.

Cache 114 holds data and/or instructions read from memory 120. Processor 110 (and/or core 112) first makes memory requests to cache 114. If cache 114 holds the requested data (e.g., a cache hit), processor 110 reads the data from cache 114 and avoids the memory access times of memory 120. If cache 114 does not hold the requested data (e.g., a cache miss), processor 110 retrieves the data from memory 120, incurring the memory access time. Although a larger cache size can reduce cache misses, considerations such as die size and power consumption limits the size of cache 114. Thus, to further reduce the need to access memory 120 on cache misses, processor 110 incorporates another cache, that is larger but slower than cache 114, in a cache hierarchy.

As will be described further below, flex cache 130 can be used for (and accordingly replace) various types of caches that would normally require separate physical cache structures that occupy die space. For example, flex cache 130 can be configured as one or more of a processor cache, an accelerator cache, a memory cache, or a probe filter. In some examples, when system 100 boots, controller 142 can configure flex cache 130 by partitioning flex cache 130 into various cache partitions corresponding to the various cache types. For instance, a BIOS of system 100 can include a configuration that designates what types of caches and the sizes of the caches such that controller 142 can partition flex cache 130 in accordance with the configuration. Moreover, in some examples, controller 142 can dynamically partition flex cache 130 based on a workload of system 100. For example, controller 142 and/or another circuit of processor 110, can analyze a workload of system 100 (e.g., how caches are used, how memory 120 is accessed, types of data processed, etc.) to determine a more efficient use of flex cache 130 (e.g., which types of caches and sizes for each type) and accordingly reconfigure flex cache 130.

Figure 2:
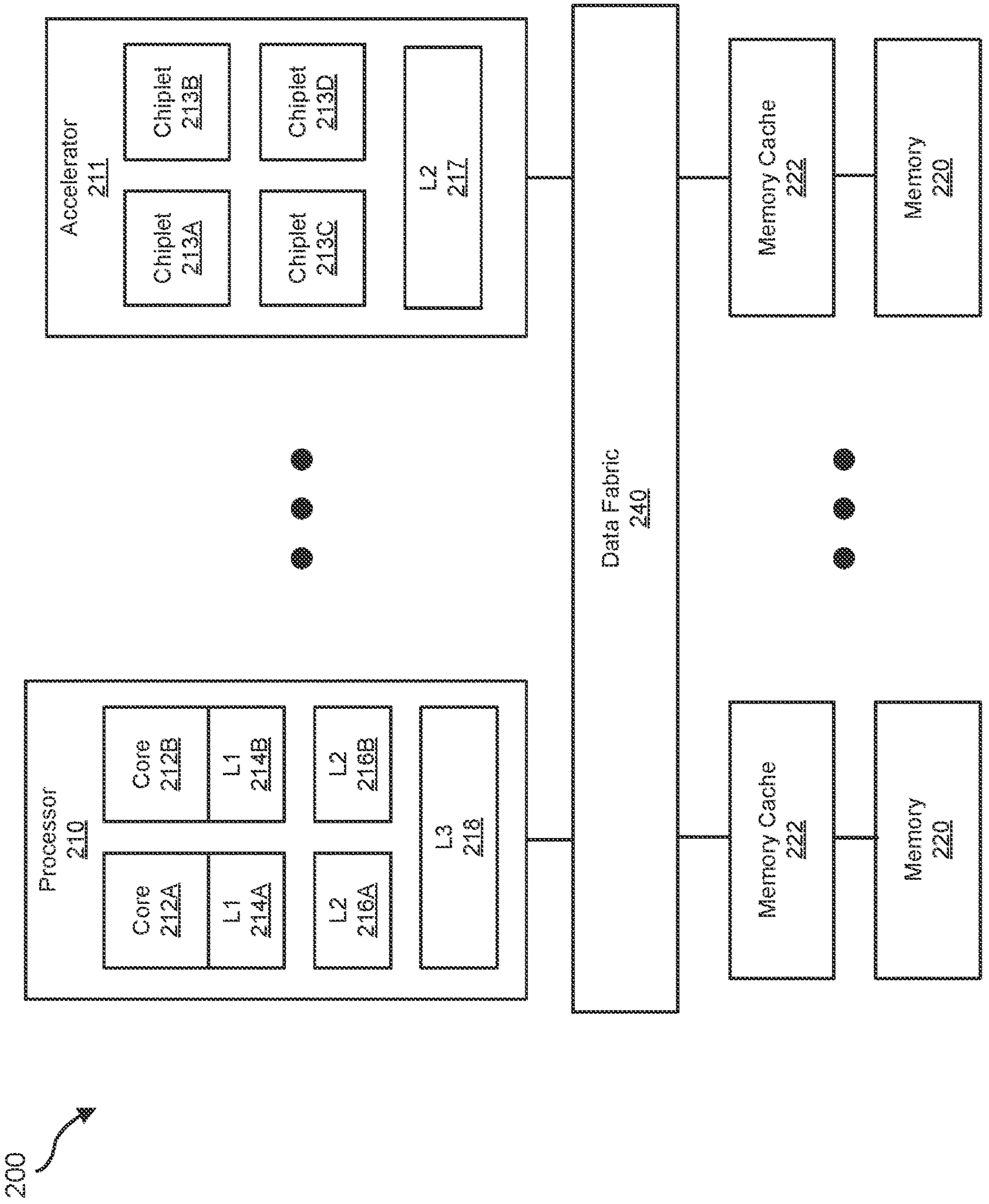
FIG. 2 is a simplified block diagram of an exemplary cache hierarchy.

In some examples, flex cache 130 can be configured as one or more levels of a cache hierarchy. FIG. 2 illustrates an example cache hierarchy in a system 200 which corresponds to system 100. System 200 includes one or more processors 210 which corresponds to processor 110 and one or more accelerators 211 which corresponds to processor 110. As illustrated in FIG. 2, processor 210 includes a core 212A which corresponds to core 112, a core 212B which corresponds to core 112, an L1 cache 214A which corresponds to cache 114, an L1 cache 214B which corresponds to cache 114, an L2 cache 216A which can correspond to cache 114, an L2 cache 216B which can correspond to cache 114, and an L3 cache 218 which can correspond to cache 114 and/or flex cache 130.

In the cache hierarchy of FIG. 2, level 1 (L1) corresponds to a lowest level of the hierarchy. L1 caches, such as L1 cache 214A and L1 cache 214B, can be implemented with a fast memory, such as static random-access memory (SRAM). To further prioritize speed, L1 caches can also be integrated with processor 210, for example within core 212A and core 212B respectively, which can improve latency and throughput. In some examples, as shown in FIG. 2, processor 210 includes multiple L1 caches.

L2 caches, such as L2 cache 216A and L2 cache 216B, are the next level in the cache hierarchy after L1 caches, which can be larger than and slower than L1 caches. Although integrated with processor 210, L2 caches can, in some examples, be located outside of a chip core, but can also be located on the same chip core package. L3 caches such as L3 cache 218 can be larger than L2 caches but can also be slower. L3 caches can serve as a bridge to the main memory (e.g., memory 220). As such, L3 caches can be faster than the main memory. In some examples, multiple processors and/or cores can share an L3 cache, which can be located on the same chip core package or outside the package.

Memory 220 which corresponds to memory 120, stores instructions and/or data for processor 210 to read and use. Memory 220 can be implemented with dynamic random-access memory (DRAM). As shown in FIG. 2, the cache hierarchy further includes a memory cache 222 (e.g., a memory-side cache) which in some examples corresponds to cache 114, and a data fabric 240 which corresponds to various structures, connections, and control circuits for sending data between memory and cache structures.

System 200 also includes one or more accelerators having a similar cache hierarchy. Accelerator 211 includes a chiplet 213A which corresponds to core 112, a chiplet 213B which corresponds to core 112, a chiplet 213C which corresponds to core 112, a chiplet 213D which corresponds to core 112, and an L2 cache 217 which corresponds to cache 114 that is shared by the chiplets.

Figure 3:
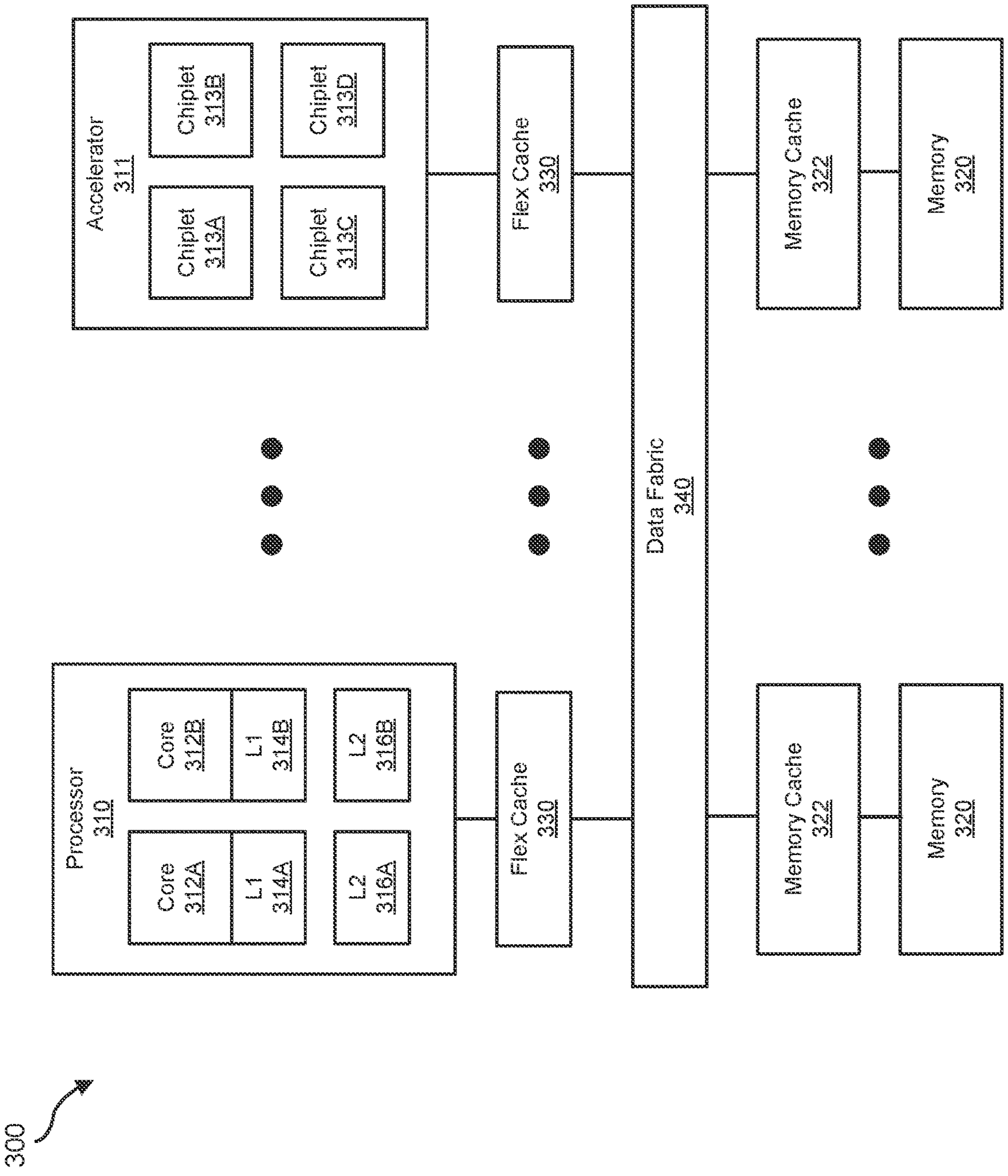
FIG. 3 is a simplified block diagram of an exemplary cache hierarchy including a flexible cache.

FIG. 3 another example cache hierarchy of a system 300 which corresponds to system 200. In FIG. 3, various cache structures are replaced by a unified flexible cache. System 300 includes one or more processors 310 which corresponds to processor 110 and one or more accelerators 311 which corresponds to processor 110. As illustrated in FIG. 3, processor 310 includes a core 312A which corresponds to core 112, a core 312B which corresponds to core 112, an L1 cache 314A which corresponds to cache 114, an L1 cache 314B which corresponds to cache 114, an L2 cache 316A which can correspond to cache 114, an L2 cache 316B which can correspond to cache 114, and a flex cache 330 which corresponds to flex cache 130.

System 300 also includes one or more accelerators similarly using flex cache 330. Accelerator 311 includes a chiplet 313A which corresponds to core 112, a chiplet 313B which corresponds to core 112, a chiplet 313C which corresponds to core 112, and a chiplet 313D which corresponds to core 112.

System 300 further includes a memory cache 322 which in some examples corresponds to cache 114, a memory 320 which corresponds to memory 120, and a data fabric 340.

As compared to FIG. 2, in FIG. 3 flex cache 330 has replaced various cache structures, namely L3 cache 218 and L2 cache 217. More specifically, flex cache 330 is partitioned into and L3 cache for processor 310 and an L2 cache for accelerator 311. Unlike the static structures of L3 cache 218 and L2 cache 217 having a predefined size, flex cache 330 can be configured to provide different sizes and different numbers of L3 and/or L2 caches as needed.

Although not illustrated in FIG. 3, flex cache 330 can be configured as other types of caches and accordingly replace cache structures, such as a memory cache (e.g., memory cache 322), a probe filter, as well as other processor caches and/or accelerator caches corresponding to other levels of the cache hierarchy. For example, flex cache 330 can be a single cache structure or series of cache structures shared between processor 310, accelerator 311, and/or other processors/devices. In other examples, each of processor 310 and accelerator 311 can have its own flex cache 330.

Figure 4:
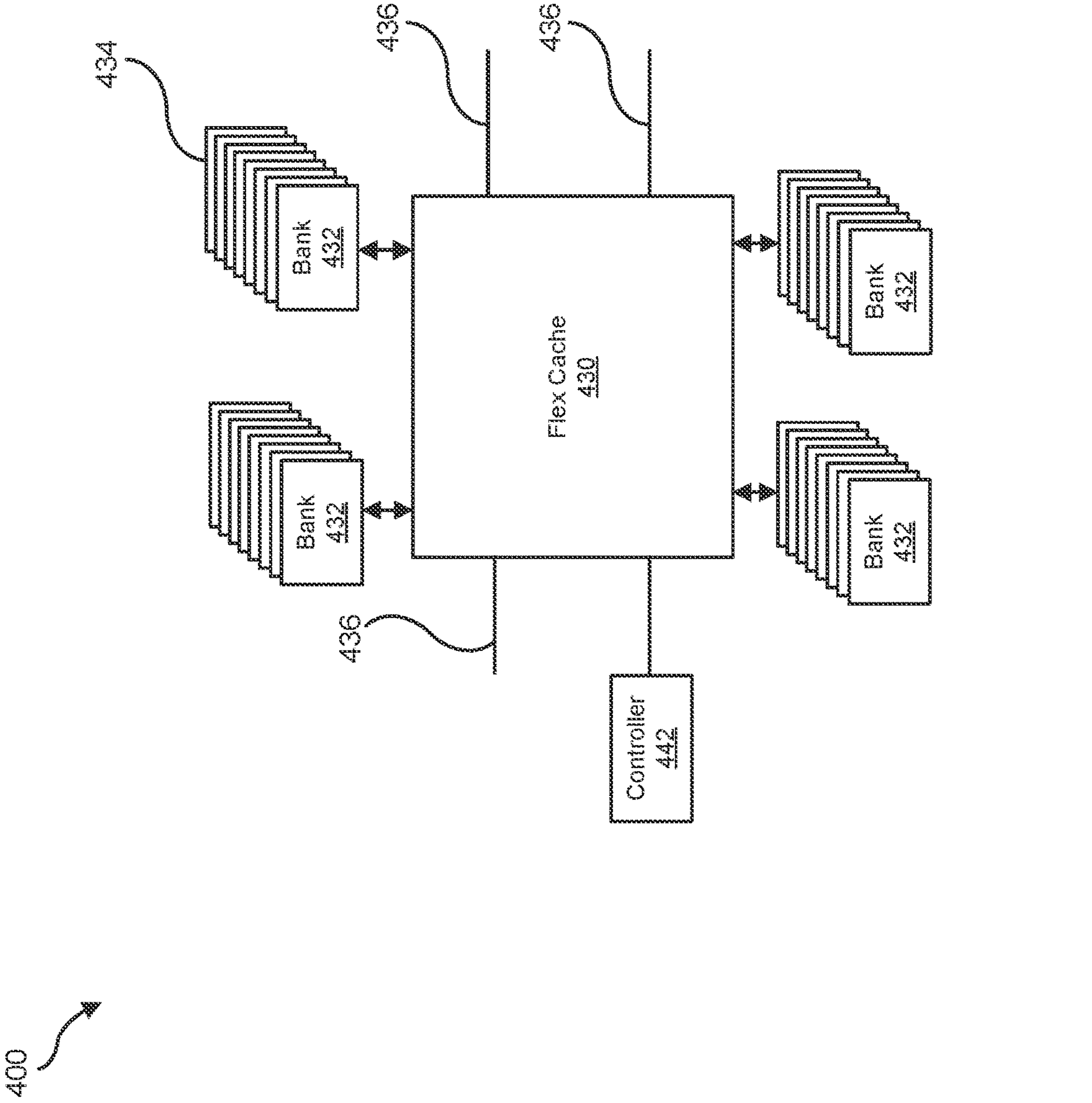
FIG. 4 is a simplified block diagram of a cache structure for a flexible cache.

FIG. 4 illustrates a device 400 corresponding to system 100. Device 400 includes a flex cache 430 which corresponds to flex cache 130 and/or flex cache 330. FIG. 4 illustrates a simplified cache structure of flex cache 430. Flex cache 430 includes various ports 436, various banks 432 organized into macros 434, and a controller 442 which corresponds to controller 142.

In some examples, controller 442 can partition flex cache 430 based on physical delineations, such as bank 432, macro 434, an index (e.g., an identifier of a physical structure), ports 436, a way (e.g., a subset of a structure). For example, based on partition sizes, controller 442 can partition flex cache 430 by designating certain banks 432 (e.g., similarly indexed banks across macros 434) or selecting macros 434 as a partition.

Figure 5:
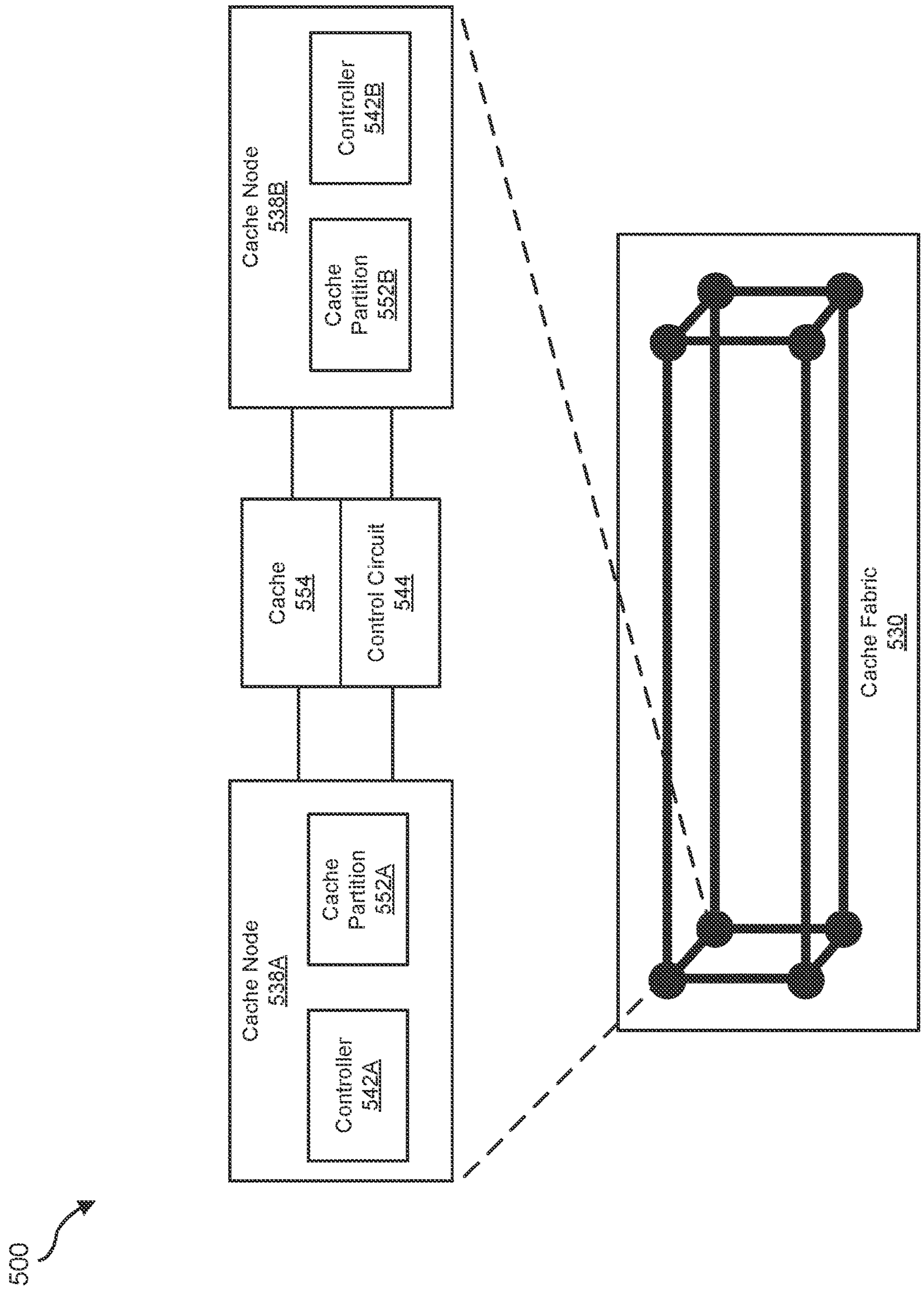
FIG. 5 is a simplified diagram of routing a memory request.

In some examples, controller 442 can, after partitioning flex cache 430, forward subsequent memory requests to the appropriate cache partition. In some examples, controller 442 forwards the memory requests based on an addressing scheme that identifies a target cache partition. For example, one or more bits of an address can identify a port coupled to the target cache partition. FIG. 5 further illustrates how memory requests can be forwarded.

FIG. 5 illustrates a device 500 corresponding to system 100. Device 500 includes a cache fabric 530 corresponding to flex cache 130 and more specifically a cache structure for flex cache 130. Cache fabric 530 includes various nodes or vertices corresponding to interconnected physical structures of the cache structure, such as a cache node 538A and a cache node 5388. Cache node 538A includes a controller 542A, which corresponds to controller 142, and a cache partition 552A. Cache node 538B includes a controller 542B, which corresponds to controller 142, and a cache partition 552B. FIG. 5 further illustrates a cache 554 and a control circuit 544, which corresponds to controller 142.

When cache fabric 530 receives a memory request, the various controllers (e.g., controller 542A, controller 5428, and/or control circuit 544) can forward the memory request to the appropriate cache partition (e.g., cache partition 552A, cache partition 552B, and/or cache 554). In some examples, forwarding the memory request also includes forwarding the memory request from one cache node to another cache node, from one cache partition to another cache partition or controller, etc. as needed.

In one example, cache node 538A receives a memory request intended for cache 554. Based on the addressing scheme, controller 542A can map the memory request as intended for a different cache node (and/or cache partition) and accordingly forwards the memory request to cache node 538B. Controller 542B (and/or in some examples cache partition 552B) can map the memory request as intended for a different cache partition and forwards the memory request to control circuit 544.

Control circuit 544 can map the memory request as intended for cache 554 and accordingly forward the memory request. In another example, control circuit 544 can forward the memory request to cache partition 552B, which can forward the memory request to cache 554 based on a cache miss.

Figure 6:
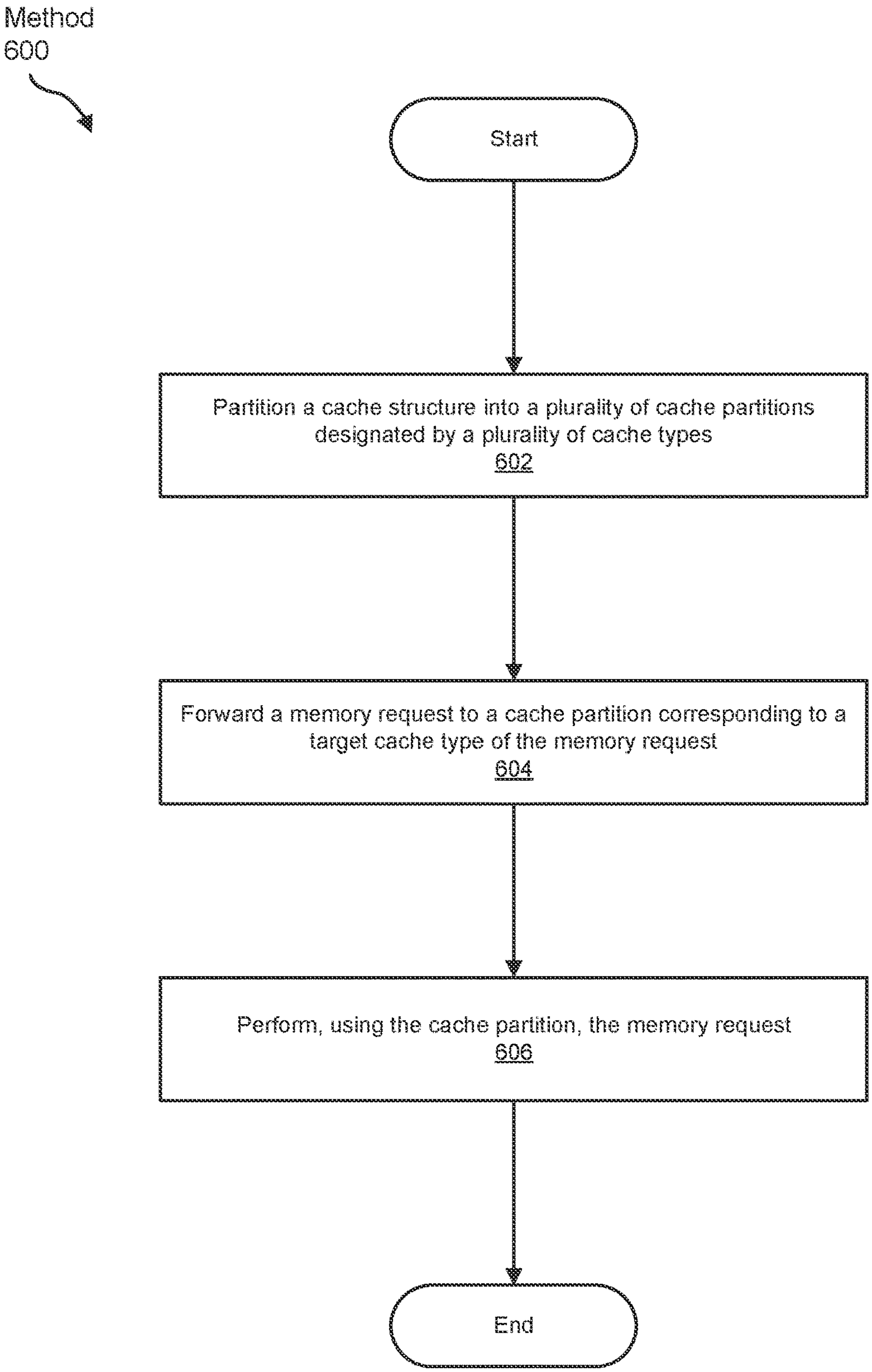
FIG. 6 is a flow diagram of an exemplary method for implementing a flexible cache.

FIG. 6 is a flow diagram of an exemplary computer-implemented method 600 for implementing a unified flex cache. The steps shown in FIG. 6 can be performed by any suitable computer-executable code and/or computing system, including the system(s) illustrated in FIGS. 1, 2, 3, 4, and/or 5. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein partitions a cache structure into a plurality of cache partitions designated by a plurality of cache types. For example, controller 142 partitions flex cache 130 into various partitions designated as various cache types.

The systems described herein can perform step 602 in a variety of ways. In one example, cache types include a processor cache, an accelerator cache, a memory cache, or a probe filter as described herein.

In some examples, partitioning the cache structure includes partitioning the cache structure based on physical delineations of the cache structure, which can correspond to at least one of a bank, a way, an index, or a macro as described herein.

In some examples, partitioning the cache structure includes partitioning the cache structure at a boot time. In some examples, partitioning the cache structure includes dynamically partitioning the cache structure based on a workload.

At step 604 one or more of the systems described herein forwards a memory request to a cache partition corresponding to a target cache type of the memory request. For example, controller 142 forwards a memory request to an appropriate cache partition of flex cache 130 corresponding to the target cache type to fulfill the memory request.

The systems described herein can perform step 604 in a variety of ways. In one example, forwarding the memory request is based on an addressing scheme incorporating cache types. For instance, the addressing scheme can include one or more bits for identifying a target cache partition. In some examples, the one or more bits correspond to a port coupled to the target cache partition. In some implementations, the bits can be repurposed bits of an address. In other implementations, additional bits can be added to an address.

At step 606 one or more of the systems described herein performs, using the cache partition, the memory request. For example, a cache partition of flex cache 130 performs the memory request, such as reading or writing data.

As described herein, a unified flexible cache can be a large cache structure that can replace various smaller cache structures, which can simplify design and fabrication and improve yield during manufacturing. In addition, the unified flex cache can be used for various types of caches, such as various levels of processor and/or accelerator caches, and other cache structures for managing a cache hierarchy, such as a probe filter. Because the flex cache can be partitioned into various sized partitions, the cache types are not restricted to a particular size (e.g., limited by the physical structure). Thus, the flex cache can be reconfigured to provide more efficient cache utilization based on system needs.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "° physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a cache structure; and a cache controller configured to:

identify a plurality of different cache types each associated with a size;

partition the cache structure into a plurality of cache partitions that correspond to the plurality of different cache types and have the corresponding sizes;

configure a first partition of the plurality of cache partitions into a client-side cache or a memory-side cache;

configure a second partition of the plurality of cache partitions into a probe filter for the first partition;

receive memory requests corresponding to the different cache types;

forward a memory request of the received memory requests to a target cache partition, wherein a target cache type of the memory request indicates the target cache partition; and perform, using the target cache partition, the memory request.

2. The device of claim 1, wherein forwarding the memory request is based on an addressing scheme incorporating cache types.

3. The device of claim 2, wherein the addressing scheme includes one or more bits for identifying the target cache partition.

4. The device of claim 3, wherein the one or more bits correspond to a port coupled to the target cache partition.

5. The device of claim 1, wherein partitioning the cache structure includes partitioning the cache structure based on physical delineations of the cache structure.

6. The device of claim 5, wherein the physical delineations correspond to at least one of a bank, a way, an index, or a macro.

7. The device of claim 1, wherein the plurality of cache partitions further includes a cache type corresponding to at least one of an accelerator cache or multiple levels of a cache hierarchy.

8. The device of claim 1, wherein partitioning the cache structure further comprises partitioning the cache structure at a boot time of the device.

9. The device of claim 1, wherein partitioning the cache structure further comprises dynamically partitioning the cache structure based on a workload of the device.

10. A system comprising:

at least one physical processor;

a physical memory;

a cache structure including a plurality of ports; and a cache controller configured to:

identify a plurality of different cache types each associated with a size;

partition the cache structure into a plurality of cache partitions that correspond to the plurality of different cache types and have the corresponding sizes, wherein each cache partition of the plurality of cache partitions is coupled to at least one of the plurality of ports;

configure a first partition of the plurality of cache partitions into a client-side cache;

configure a second partition of the plurality of cache partitions into a memory-side cache;

receive memory requests corresponding to the different cache types;

forward a memory request of the received memory requests along one of the plurality of ports to a target cache partition based on a target cache type of the memory request indicating the target cache partition; and perform, using the target cache partition, the memory request.

11. The system of claim 10, wherein forwarding the memory request is based on an addressing scheme including one or more bits for identifying a port coupled to the target cache partition.

12. The system of claim 10, wherein partitioning the cache structure includes partitioning the cache structure based on at least one of a bank, a way, an index, or a macro.

13. The system of claim 10, wherein the plurality of cache partitions further includes a cache type corresponding to at least one of an accelerator cache, multiple levels of a cache hierarchy, or a probe filter.

14. The system of claim 10, wherein partitioning the cache structure further comprises partitioning the cache structure at a boot time of the system.

15. The system of claim 10, wherein partitioning the cache structure further comprises dynamically partitioning the cache structure based on a workload of the system.

16. A method comprising:

identifying, during a boot time of a system, a plurality of different cache types each associated with a size;

partitioning, during the boot time of the system, a cache structure into a plurality of cache partitions that correspond to the plurality different cache types and have the corresponding sizes;

configuring a first partition of the plurality of cache partitions into a client-side cache;

configuring a second partition of the plurality of cache partitions into a memory-side cache;

configuring a third partition of the plurality of cache partitions into a probe filter;

receiving memory requests corresponding to the different cache types;

forwarding a memory request of the received memory requests from a first cache partition to a target cache partition based on a target cache type of the memory request indicating the target cache partition; and performing, using the target cache partition, the memory request.

17. The method of claim 16, wherein forwarding the memory request is based on an addressing scheme that includes one or more bits for identifying a target cache type.

18. The method of claim 16, wherein partitioning the cache structure includes partitioning the cache structure based on at least one of a bank, a way, an index, or a macro.

19. The method of claim 16, wherein the plurality of cache partitions further includes a cache type corresponding to at least one of an accelerator cache or multiple levels of a cache hierarchy.

20. The method of claim 16, wherein partitioning the cache structure further comprises dynamically partitioning the cache structure based on a workload of the system.

* * * * *